US012418464B2

(12) United States Patent
Shariat

(10) Patent No.: US 12,418,464 B2
(45) Date of Patent: Sep. 16, 2025

(54) METHOD AND APPARATUS FOR IMPROVEMENTS IN APPLICATION DISCOVERY AND EVENT EXPOSURE

(71) Applicant: Samsung Electronics Co., Ltd., Gyeonggi-do (KR)

(72) Inventor: Mehrdad Shariat, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/519,717

(22) Filed: Nov. 27, 2023

(65) Prior Publication Data

US 2024/0098153 A1    Mar. 21, 2024

Related U.S. Application Data

(63) Continuation of application No. 17/502,757, filed on Oct. 15, 2021, now Pat. No. 11,856,068.

(30) Foreign Application Priority Data

Oct. 15, 2020  (GB) ........................................ 2016352
Nov. 5, 2020  (GB) ........................................ 2017509

(Continued)

(51) Int. Cl.
*H04L 67/51*    (2022.01)
*H04L 41/12*    (2022.01)
(Continued)

(52) U.S. Cl.
CPC ............ *H04L 43/065* (2013.01); *H04L 41/50* (2013.01); *H04L 67/303* (2013.01); *H04L 67/51* (2022.05); *H04L 41/12* (2013.01)

(58) Field of Classification Search
CPC ................................ H04L 67/51; H04L 41/50
(Continued)

(56) References Cited

U.S. PATENT DOCUMENTS 11,695,680 B2 *   7/2023   Lee .......................... H04L 43/50
                                                            709/224
2019/0356558 A1   11/2019   Han et al.
(Continued)

FOREIGN PATENT DOCUMENTS

WO    WO 2019/158737    8/2019
WO    WO 2020/018012    1/2020

OTHER PUBLICATIONS

3GPP, 3rd Generation Partnership Project; Technical Specification Group Services and System Aspects; Architecture Enhancements for 5G System (5GS) to Support Network Data Analytics Services (Release 16), 3GPP TS 23.288 V16.1.0, Sep. 2019, 52 pages.
(Continued)

*Primary Examiner* — Wing F Chan
*Assistant Examiner* — Leon Y Tseng
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of things (IoT). A method, by a network data analytics function (NWDAF) entity, for supporting user equipment (UE) data collection from a UE, includes receiving, from a service consumer network function (NF) entity, a first request for the UE data collection for analytics, the first request including analytics filter information, discovering an application function (AF) entity that provides the UE data collection based on AF profiles of the AF entity, determining a list of subscription permanent identifiers (SUPIs) from at least one of an access and mobile management function (AMF) entity and a session management function (SMF) entity based on the analytics filter information, transmitting, to the AF entity, a second request for a subscription to the AF entity for the (Continued)

UE data collection, wherein the subscription is associated with a list of UEs related to the determined list of the SUPIs, and receiving, from the AF entity, a notification on processed data collected according to the subscription.

20 Claims, 3 Drawing Sheets

(30) Foreign Application Priority Data

Jan. 15, 2021 (GB) .................................... 2100542
Oct. 4, 2021 (GB) .................................... 2114204

(51) Int. Cl.
*H04L 41/50* (2022.01)
*H04L 43/065* (2022.01)
*H04L 67/303* (2022.01)

(58) Field of Classification Search
USPC ..................................................... 709/224
See application file for complete search history.

(56) References Cited

U.S. PATENT DOCUMENTS

| | | | |
|---|---|---|---|
| 2020/0322775 A1 | 10/2020 | Lee et al. | |
| 2021/0219151 A1 | 7/2021 | Florese | |
| 2021/0392540 A1* | 12/2021 | Chong | H04W 28/0268 |
| 2022/0360977 A1* | 11/2022 | Kim | H04L 65/80 |

OTHER PUBLICATIONS

Samsung et al., "Policy Control using DN Authorization Profile Index", S2-1902347, 3GPP TSG SA WG2 Meeting #131, Feb. 25-Mar. 1, 2019, 11 pages.
3GPP, 3rd Generation Partnership Project; Technical Specification Group Services and System Aspects; Architecture Enhancements for 5G System (5GS) to Support Network Data Analytics Services (Release 16), 3GPP TS 23.288 V16.5.0, Sep. 2020, 64 pages.
International Search Report dated Jan. 24, 2022 issued in counterpart application No. PCT/KR2021/014388, 8 pages.
European Search Report dated Mar. 7, 2022 issued in counterpart application No. 21202949.0-1216, 9 pages.
Samsung, "KI#8, Sol #29: Update to UE Input Data for CP Load Balancing Analytics", S2-2006254, SA WG2 Meeting #140-E, Aug. 19-Sep. 2, 2020, 5 pages.
Ericsson et al., "KI#8, Solution #27—UE Data as an Input for Analytics Generation", S2-2006252, Aug. 19-Sep. 1, 2020, 7 pages.
British Examination Report dated Jun. 15, 2022 issued in counterpart application No. 2114204.7, 13 pages.
EP Communication Report dated Apr. 11, 2025 issued in counterpart application No. 21202949.0-1206, 5 pages.
Samsung et al., "Policy Control using DN Authorization Profile Index", S2-1902693, 3GPP TSG SA WG2 Meeting #131, Feb. 25-Mar. 1, 2019, 12 pages.
Japanese Office Action dated Jun. 17, 2025 Issued in counterpart application No. 2023-523186, 11 pages.
Nokia, Nokia Shanghai Bell, "KI#3, New Solution: Providing Selected Radio Information to an App Requiring It", S2-2003660, SA WG2 Meeting #139e, Jun. 1-12, 2020, 6 pages.
Chinese Office Action dated Jul. 31, 2025 issued in counterpart application No. 202180070519.5, 27 pages.

* cited by examiner

METHOD AND APPARATUS FOR IMPROVEMENTS IN APPLICATION DISCOVERY AND EVENT EXPOSURE

CROSS-REFERENCE TO RELATED APPLICATION(S)

This application is a Continuation Application of U.S. patent application Ser. No. 17/502,757, which was filed in the U.S. Patent and Trademark Office on Oct. 15, 2021, and is based on and claims priority under 35 U.S.C. § 119(a) to United Kingdom (U.K.) Patent Application Number 2016352.3, filed on Oct. 15, 2020, in the U.K. Intellectual Property Office; U.K. Patent Application Number 2017509.7, filed on Nov. 5, 2020, in the U.K. Intellectual Property Office; U.K. Patent Application Number 2100542.6, filed on Jan. 15, 2021, in the U.K. Intellectual Property Office; and U.K. Patent Application Number 2114204.7, filed on Oct. 4, 2021, in the U.K. Intellectual Property Office, the entire disclosure of each of which is incorporated herein by reference.

BACKGROUND

1. Field

The present disclosure relates generally to improvements in application function (AF) discovery and event exposure.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

$3^{rd}$ Generation Partnership Project (3GPP) standardizes what is known as service-based architecture (SBA) for the $5^{th}$ generation (5G) Core as part of system architecture for 5G systems, starting with Release 15. SBA for 5G Core as part of system architecture for 5G systems will continue to be developed in Release 16, 17, and beyond. In SBA, different network functions and associated services can directly communicate with each other as an originator or consumer of a service via a common bus known as a service-based interface (SBI).

It would be advantageous to provide a network data analytics function (NWDAF) within an SBA, allowing network functions' access to analytics for different purposes, including intelligent automated network configuration and deployment.

SUMMARY

The present disclosure has been made to address the above-mentioned problems and disadvantages, and to provide at least the advantages described below.

In accordance with an aspect of the present disclosure, a method, by a network data analytics function (NWDAF) entity, for supporting user equipment (UE) data collection from a UE, includes receiving, from a service consumer network function (NF) entity, a first request for the UE data collection for analytics, the first request including analytics filter information, discovering an application function (AF) entity that provides the UE data collection based on AF profiles of the AF entity, determining a list of subscription permanent identifiers (SUPIs) from at least one of an access and mobile management function (AMF) entity and a session management function (SMF) entity based on the analytics filter information, transmitting, to the AF entity, a second request for a subscription to the AF entity for the UE data collection, wherein the subscription is associated with a list of UEs related to the determined list of the SUPIs, and receiving, from the AF entity, a notification on processed data collected according to the subscription.

In accordance with another aspect of the present disclosure, a method, by an AF entity, for UE data collection, includes receiving, from an NWDAF entity, a first request for a subscription for the UE data collection based on AF profiles of the AF entity, wherein the subscription is associated with a list of UEs related to a list of SUPIs, collecting UE data from a UE and processing the UE data, and transmitting, to the NWDAF entity, a notification on the processed UE data according to the subscription, wherein the list of the SUPIs is determined from at least one of an AMF entity and an SMF entity based on analytics filter information, and wherein the analytics filter information is included in a second request for the UE data collection.

In accordance with another aspect of the present disclosure, an NWDAF entity for supporting UE data collection from a UE includes a transceiver, and at least one processor coupled to the transceiver and configured to receive, from a service consumer NF entity, a first request for the UE data collection for analytics, the first request including analytics filter information, discover an AF entity that provides the UE data collection based on AF profiles of the AF entity, determine a list of SUPIs from at least one of an AMF entity and an SMF entity based on the analytics filter information, transmit, to the AF entity, a second request for a subscription to the AF entity for the UE data collection, wherein the subscription is associated with a list of UEs related to the determined list of the SUPIs, and receive, from the AF entity, a notification on processed data collected according to the subscription.

In accordance with another aspect of the present disclosure, an AF entity for UE data collection includes a transceiver, and at least one processor coupled to the transceiver and configured to receive, from an NWDAF entity, a first request for a subscription for the UE data collection based on AF profiles of the AF entity, wherein the subscription is associated with a list of UEs related to a list of SUPIs, collect UE data from a UE and process the UE data, and transmit, to the NWDAF entity, a notification on the processed UE data according to the subscription, wherein the list of the SUPIs is determined from at least one of an AMF entity and an SMF entity based on analytics filter information, and wherein the analytics filter information is included in a second request for the UE data collection.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
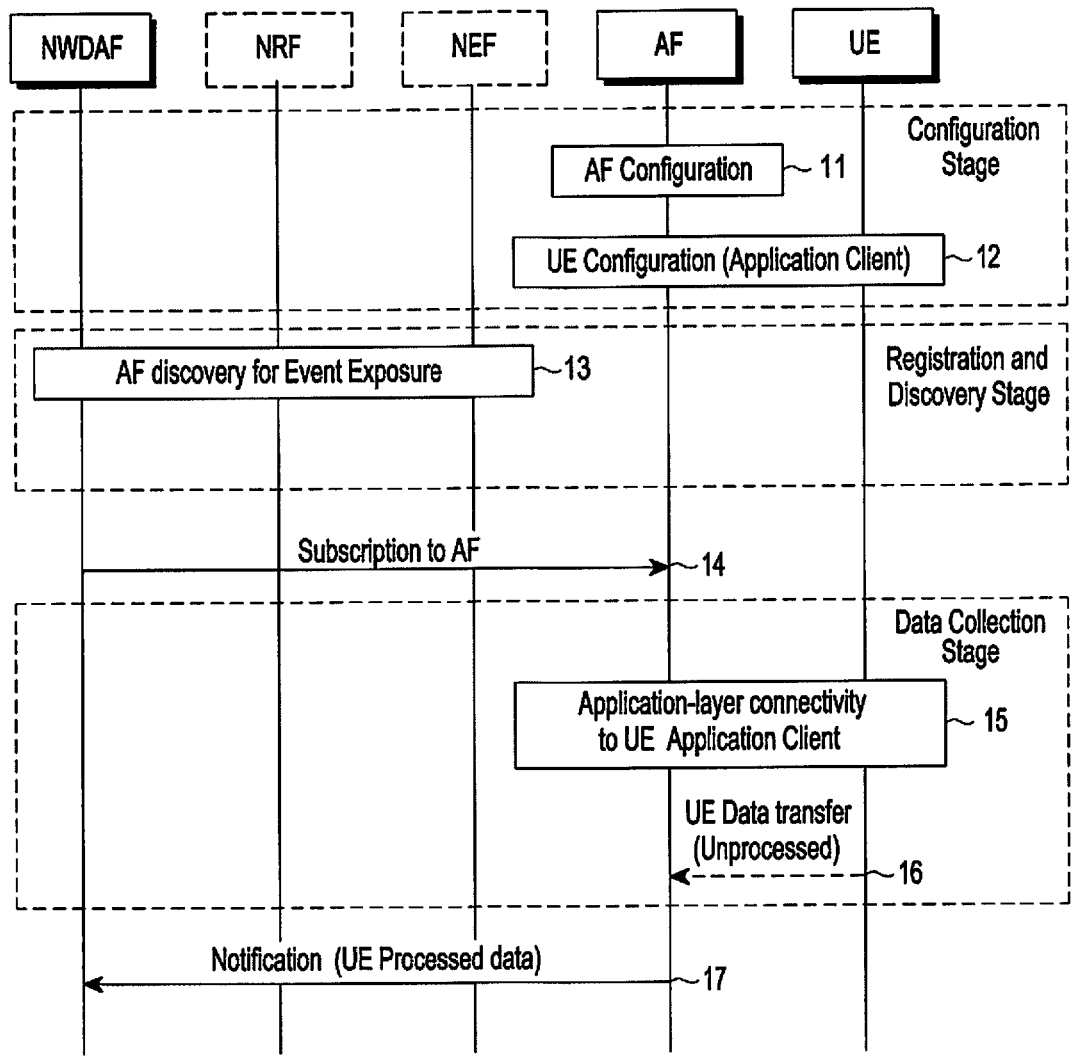
FIG. 1 illustrates a data collection procedure from a UE, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

A method of AF discovery and AF event exposure is provided. The method may collect and generate analytics by crowd-sourcing UE input data from multiple application clients on UE(s). This involves new procedures, input parameters, event filters and analytics filters to interact between an AF (either inside or outside a mobile network operator (MNO) domain) with NWDAF and other 5G Core NFs.

Figure 2:
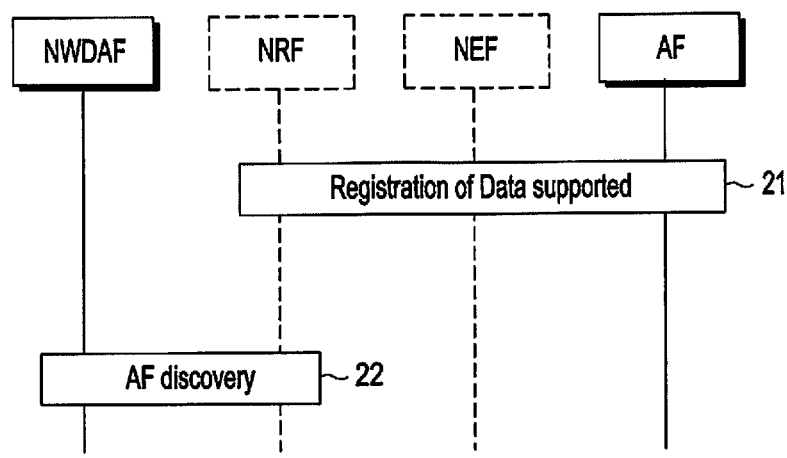
FIG. 2 illustrates an AF discovery procedure, according to an embodiment.
Figure 3:
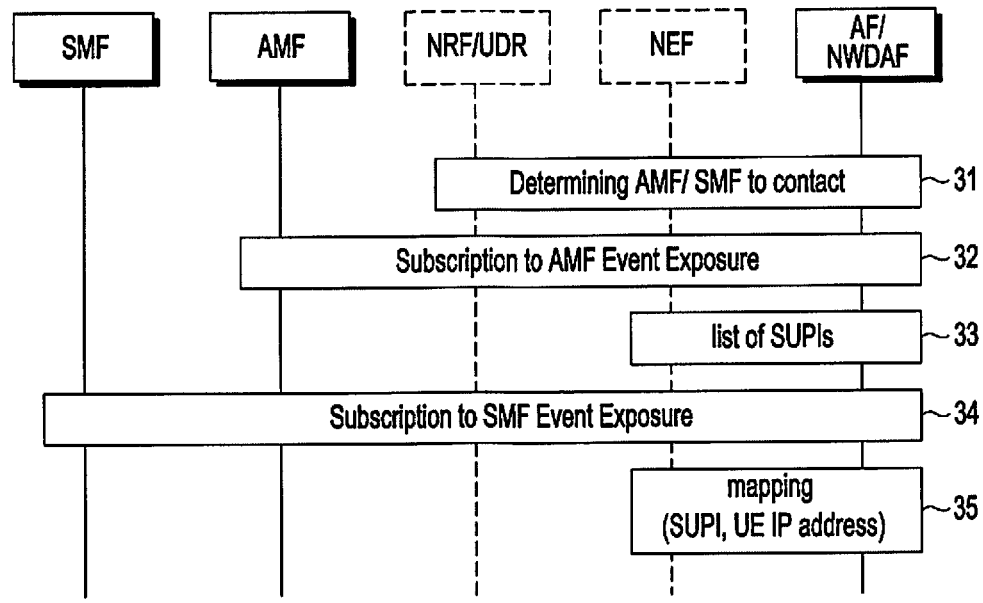
FIG. 3 illustrates a mapping procedure between a UE Internet protocol (IP) address and a subscription permanent identifier (SUPI), according to an embodiment.

FIGS. 1-3 show various network functions/entities, whose functions and definitions are known in the art in at least: 3GPP TS 23.501, 3GPP TS 23.502 and 3GPP TS 23.288. The various known functions of these network functions/entities are varied/enhanced as described in the following paragraphs.

At least some of the various functions/entities may include one or more of:
  a UE,
  an AF,
  a network exposure function (NEF),
  a network repository function (NRF),
  an NWDAF,
  a session management function (SMF),
  an access and mobility management function, (AMF), and/or
  a unified data repository (UDR).

FIG. 1 illustrates a data collection procedure from a UE, according to an embodiment.

Referring to FIG. 1, in step 11, an NWDAF subscribes to an AF based on policies agreed upon during a configuration step. If an AF is a trusted AF within an MNO domain, an event identification (ID) and/or an AF identification marker corresponding to specific applications (e.g. internal and/or external application IDs) that support UE data collection may be configured for the AF (e.g. related to network function (NF) load analytics or any other analytics types). This may be for event exposure from the AF. The configuration can be done by MNO (e.g., via operations, administration, and maintenance (OAM) procedures). If an AF is not a trusted AF (i.e., an untrusted AF), an event ID and/or AF identification marker corresponding to specific applications that support UE data collection can be configured in NEF (e.g., via OAM procedures).

In step 12, the corresponding application client(s) at a UE level are configured for UE data collection with corresponding AF addresses from step 11. Different application clients can be configured with different either trusted (within an MNO domain) AF addresses or untrusted AF addresses. UE(s) can be requested to provide consent at this stage. Application client(s) at the UE level are only configured for UE(s) that grant such consent. If a UE revokes consent in the future, the corresponding application client(s) can be reconfigured or signaled to stop UE data collection from that UE. Different application clients can be configured with different expiration times for either collected data or user consent. Upon expiration of the collected data, UE data can be deleted or removed. Upon expiration of a user consent period, a new request can be sent to the UE to renew or update the user consent. The configuration or reconfiguration can be triggered over a control plane (CP) (e.g., via a policy control function (PCF) based on the AF request). Alternatively, the configuration or reconfiguration can be triggered over a user plane (UP) (e.g. via application-level signaling over hypertext transfer protocol secure (HTTPS)).

In step 13, the NWDAF, when receiving a request from a service consumer NF that requires UE data collection via an AF (e.g. for NF load analytics or any other analytics types), follows an AF discovery procedure, as will be described with reference to FIG. 2.

In step 14, the NWDAF subscribes to an event exposure function of the AF (for a trusted AF) or an NEF (for an untrusted AF) based on AF profile(s) discovered in step 13. The NWDAF may select a single or multiple Afs, depending on its configuration. The NWDAF may include a target of analytics reporting (as a single UE or any UE), the event ID (i.e. the new event ID related to NF load analytics or any other analytics types), and event/analytics filters related to the area of interest or application ID(s), either internal and/or external, if known.

For a trusted AF, the area of interest can be in the form of tracking areas (TAs). For an untrusted AF, NEF can translate the area of interest from internally identified TAs within 5G Core to externally identified geographic zones, or vice versa. The NEF may also translate any other event filters as outlined before, if needed. When the target of reporting is any UE, event/analytics filters related to the area of interest or application ID(s) are provided. When the target is any UE, the AF (either directly or via the NEF) or the NWDAF may subscribe to AMF event exposure and SMF event exposure to retrieve a list of SUPIs (or external UE IDs) and to form a mapping between SUPIs (or external UE IDs) and UE IP addresses, as will be described with reference to FIG. 3.

Alternatively, the NWDAF may provide a list of retrieved 5G globally unique SUPIs (or external UE IDs) that support corresponding application ID(s). If some SUPIs (or external UE IDs) do not support corresponding application ID(s), the AF may exclude them from data collection process.

New event/analytics filters for AF event exposure can be defined if the NWDAF plans to instruct certain type of data processing to the AF (e.g., for anonymization, normalization, aggregation or other forms of enhancements).

New event/analytics filters for AF event exposure can be defined if the NWDAF plans to instruct a certain type of attribute as clustering for UE collective behavior (e.g. based on route, destination, average speed, time interval spent per location, relative proximity, orientation, velocity, or any other clustering attribute/pattern recognition criteria).

New event/analytics filters for AF event exposure can be defined if the NWDAF plans to instruct a minimum number of UEs, a maximum number of UEs or specific thresholds to trigger characterizing a collective behavior (e.g., characterizing UE velocity, average speed, relative distance, or orientation)

The event filters for AF event exposure can be set based on the request from a NWDAF service consumer (as analytics filters set within the request to the NWDAF). Alternatively, event filters can be set based on the NWDAF internal configuration per analytics type (or event ID).

In step 15, each AF establishes a secure application-layer connectivity to its corresponding UE application clients (configured and consented in step 11 and step 12) using the mapped UE IP address from a SUPI within the AF (refer to FIG. 3).

In step 16, a UE data transfer occurs for unprocessed data to the AF.

In step 17, each AF may post-process the collected data (e.g., to aggregate, anonymize, normalize or to enhance the collected data) from multiple UEs. This is based on instructions received from NWDAF as input parameters or event filters in step 14. AF then may notify the NWDAF once the post-process finishes. Alternatively, AF may store the data in a data repository like UDR via Unified Data Management (UDM) Services. Then, NWDAF may collect data from UDR.

FIG. 2 illustrates an AF discovery procedure, according to an embodiment.

Referring to FIG. 2, in step 21, a trusted AF within an MNO domain directly registers its capability in a NRF reflecting the support of an event ID corresponding to specific applications that support UE data collection (e.g., a new Event ID related to NF load analytics or any other analytics types). For an untrusted AF, an NEF can be configured to register an AF capability in NRF reflecting the support of an event ID corresponding to specific applications that support UE data collection (e.g., a new event ID related to NF load analytics or any other analytics types). The mapping between event ID and application ID(s), either internal and/or external, can be transparent or registered within an NRF. Multiple AFs (either trusted, untrusted or a mixture of both) within or outside an MNO domain may support such an event ID, each covering part of or the entire set of relevant application ID(s). Different AFs supporting a certain event ID may cover different sections of an area of interest (as tracking areas (Tas) or Geographic Zones). For either trusted AF or untrusted AF, extra metadata can be registered within an NRF indicating what types of attributes, clustering criteria or triggers are supported in line with event filters defined for FIG. 1.

In step 22, the NWDAF uses the NRF discovery request and response services to identify the AFs to collect data. The NWDAF may include the NEF NF type (for untrusted AFs), the new event ID (or event IDs) or optionally any application ID(s), either internal and/or external, provided by an NWDAF service consumer. The NRF returns matching NEFs (for an untrusted AF) or AF profiles (for a trusted AF) in a discovery response. Alternatively, for trusted AFs, the NWDAF can be configured with a list of trusted AFs in a MNO domain supporting the new event ID or event IDs.

FIG. 3 illustrates a mapping procedure between a UE IP address and a SUPI, according to an embodiment.

Referring to FIG. 3, in step 31, an AF (or NEF) subscribes to Nnrf_NFDiscovery based on event filters provided on the area of interest or application ID(s), either internal and/or external, if matching SMF and AMF instances are found.

However, as an alternative to this, the AF (or NEF) may find the matching SMF from a UDR (from UDM services) based on SUPIs retrieved from an AMF.

In step 32, per AMF instance identified in 31, the AF (or NEF) subscribes to an AMF event exposure (e.g., a UE moving in or out of a subscribed "area of interest"), providing part of the area of interest matching to a service area, per AMF instance. The AMF instance notifies SUPI(s) in the area of interest.

In step 33, a list of SUPIs is retrieved, either individually or collectively, based on step 32.

In step 34, per the SMF instance identified in step 31, the AF (or NEF) subscribes to SMF event exposure (e.g. for a UE IP address/prefix allocation change or protocol data unit (PDU) session establishment and/or a PDU session release from SMF), setting the target of event reporting as a SUPI based on the list of SUPIs retrieved in step 32 and step 33. The SMF instance provides notification for the UE IP address (per SUPI).

In step 35, the AF (or NEF) forms and stores a mapping table based on step 34 that translates a SUPI to a UE IP address and vice versa.

To establish a connection to a UE application client in step 15 or step 16 of FIG. 1, to collect UE data, the AF (or NEF) translates the internal SUPI to the corresponding UE IP address based on the mapping table. The UE IP address can be communicated from the AF to the UE application client, or vice versa, via application-level signaling (e.g., between the AF and a media session handler in the UE application client). Alternatively, the UE IP address can be encapsulated within the UE data when the UE sends the data towards the AF with an extra layer of security to scramble or protect the UE IP address.

The mapping of SUPIs to UE IP addresses can be configured in the AF, NEF or can be stored by the AF in a UDR (via UDM services).

The mapping of SUPIs to UE IP addresses can be marked, anonymized or deleted from the AF, NEF or UDR when the user consent for the data expires or if the user consent is revoked.

In case SUPIs cannot be exposed to the AF, either directly (for a trusted AF) or to the NEF (for an untrusted AF), as an alternative a NWDAF may follow the procedure described in FIG. 3 instead of the AF (or NEF). The NWDAF may translate the mapping between SUPIs and UE IP addresses to a mapping between external UE IDs (e.g., generic public subscription identifiers (GPSIs)) and UE IP addresses that can be exposed and consumed by the AF (or NEF).

The mapping of external UE IDs (e.g., GPSIs) to UE IP addresses can be configured in the AF, NEF or can be stored by the NWDAF in a UDR (via UDM services).

The mapping of external UE IDs (e.g., GPSIs) to UE IP addresses can be marked, anonymized or deleted from the AF, NEF or UDR, when the user consent for the data expires or if the user consent is revoked.

Figure 4:
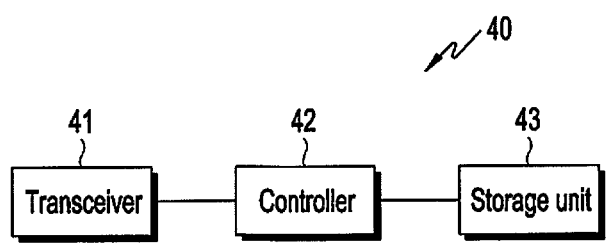
FIG. 4 illustrates structures of NF entities, according to an embodiment.

FIG. 4 illustrates structures of NF entities, according to an embodiment of the present disclosure. The NF entities according to an embodiment may include an NWDAF entity, an AF entity, an NRF entity, an NEF entity, an SMF entity, an AMF entity, and a UDR entity.

Referring to FIG. 4, the NF entity 40 may include a transceiver 41, a controller 42, and a storage unit 43. The controller 42 may be defined as a circuit or application-specific integrated circuit or at least one processor.

The transceiver 41 may transmit and receive messages to/from other NF entities. The transceiver 41 may transmit a request for subscription to an event exposure function of other NF entities according to the above-described embodiments.

The controller 42 may control the overall operation of the NF entity 40. For example, the controller 42 may process the data collected from the UE according to the subscription of the NF entity 40 according to the above-described embodiments.

The storage unit 42 may store at least one of information transmitted/received via the transceiver 41 and information generated via the controller 42, according to the above-described embodiments. For example, the storage unit 42 may store a UE IP address or application ID according to the above-described embodiments.

At least some of the example embodiments described herein may be constructed, partially or wholly, using dedicated special-purpose hardware. Terms such as "component", "module" or "unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. A method, by a network data analytics function (NWDAF) entity, for supporting user equipment (UE) data collection from a UE, the method comprising:
   receiving, from a service consumer network function (NF) entity, a first request for the UE data collection for analytics, the first request including analytics filter information;
   discovering an application function (AF) entity that provides the UE data collection based on AF profiles of the AF entity;
   determining a list of subscription permanent identifiers (SUPIs) from at least one of an access and mobility management function (AMF) entity and a session management function (SMF) entity based on the analytics filter information;
   transmitting, to the AF entity, a second request for a subscription to the AF entity for the UE data collection, wherein the subscription is associated with a list of UEs related to the determined list of the SUPIs; and
   receiving, from the AF entity, a notification on processed data collected according to the subscription,
   wherein the second request for the subscription to the AF entity triggers the UE data collection.

2. The method of claim 1,
wherein the analytics filter information is related to at least one of:
an area of interest; or
at least one application identifier (ID).

3. The method of claim 1,
wherein the UE data collection is performed via a user plane connection between the AF entity and the UE,
wherein a UE internet protocol (IP) address is used for the user plane connection, and
wherein the AF profiles comprise at least one event identifier (ID) supported by the AF entity and at least one supported application ID.

4. The method of claim 1, further comprising:
transmitting, to the NWDAF entity, the list of the SUPIs;
wherein a SUPI in the determined list of the SUPIs is mapped to a UE internet protocol (IP) address.

5. The method of claim 1, further comprising:
transmitting, to the AF entity, a third request for a certain type of data processing from the AF entity based on event filter information.

6. A method, by an application function (AF) entity, for user equipment (UE) data collection, the method comprising:
receiving, from a network data analytics function (NWDAF) entity, a first request for a subscription for the UE data collection based on AF profiles of the AF entity, wherein the subscription is associated with a list of UEs related to a list of subscription permanent identifiers (SUPIs);
collecting UE data from a UE and processing the collected UE data, wherein collecting the UE data is triggered by the first request for the subscription; and
transmitting, to the NWDAF entity, a notification on the processed UE data collected according to the subscription,
wherein the list of the SUPIs is determined from at least one of an access and mobility management function (AMF) entity and a session management function (SMF) entity based on analytics filter information, and
wherein the analytics filter information is included in a second request for the UE data collection.

7. The method of claim 6,
wherein the analytics filter information is related to at least one of:
an area of interest; or
at least one application identifier (ID).

8. The method of claim 6, further comprising:
establishing a user plane connection to the UE,
wherein the UE data is collected via the user plane connection,
wherein a UE internet protocol (IP) address is used for the user plane connection,
wherein the UE data is processed based on policies agreed to for the UE data collection that is configured in the AF entity, and
wherein the AF profiles comprise at least one event identifier (ID) supported by the AF entity and at least one supported application ID.

9. The method of claim 6, further comprising receiving, from the NWDAF entity, the list of the SUPIs.

10. The method of claim 9, further comprising:
finding the SMF entity, from a unified data repository (UDR) entity, based on the list of SUPIs;
transmitting, to the SMF entity, a third request for a subscription to an event exposure function of the SMF entity, the third request including a target of an event reporting set to a SUPI based on the list of the SUPIs and an internet protocol (IP) address allocation or change;
receiving, from the SMF entity, a UE IP address corresponding to the SUPI; and
mapping the UE IP address to the SUPI.

11. A network data analytics function (NWDAF) entity for supporting user equipment (UE) data collection from a UE, the NWDAF entity comprising:
a transceiver; and
at least one processor coupled to the transceiver and configured to:
receive, from a service consumer network function (NF) entity, a first request for the UE data collection for analytics, the first request including analytics filter information,
discover an application function (AF) entity that provides the UE data collection based on AF profiles of the AF entity,
determine a list of subscription permanent identifiers (SUPIs) from at least one of an access and mobility management function (AMF) entity and a session management function (SMF) entity based on the analytics filter information,
transmit, to the AF entity, a second request for a subscription to the AF entity for the UE data collection, wherein the subscription is associated with a list of UEs related to the determined list of the SUPIs, and
receive, from the AF entity, a notification on processed data collected according to the subscription,
wherein the second request for the subscription to the AF entity triggers the UE data collection.

12. The NWDAF entity of claim 11,
wherein the analytics filter information is related to at least one of:
an area of interest; or
at least one application identifier (ID).

13. The NWDAF entity of claim 11,
wherein the UE data collection is performed via a user plane connection between the AF entity and the UE,
wherein a UE internet protocol (IP) address is used for the user plane connection, and
wherein the AF profiles comprise at least one event identifier (ID) supported by the AF entity and at least one supported application ID.

14. The NWDAF entity of claim 11, wherein the at least one processor is further configured to:
transmit, to the NWDAF entity, the list of the SUPIs, and
wherein a SUPI in the determined list of the SUPIs is mapped to a UE internet protocol (IP) address.

15. The NWDAF entity of claim 11, wherein the at least one processor is further configured to:
transmit, to the AF entity, a third request for a certain type of data processing from the AF entity based on event filter information.

16. An application function (AF) entity for user equipment (UE) data collection, the AF entity comprising:
a transceiver; and
at least one processor coupled to the transceiver and configured to:
receive, from a network data analytics function (NWDAF) entity, a first request for a subscription for the UE data collection based on AF profiles of the AF entity, wherein the subscription is associated with a list of UEs related to a list of subscription permanent identifiers (SUPIs), collect UE data from a UE and process the collected UE data, wherein collecting the UE data is triggered by the first request for the subscription, and transmit, to the NWDAF entity, a notification on the processed UE data collected according to the subscription, wherein the list of the SUPIs is determined from at least one of an access and mobility management function (AMF) entity and a session management function (SMF) entity based on analytics filter information, and wherein the analytics filter information is included in a second request for the UE data collection.

17. The AF entity of claim 16, wherein the analytics filter information is related to at least one of:

an area of interest; or at least one application identifier (ID).

18. The AF entity of claim 16, wherein the at least one processor is further configured to:

establish a user plane connection to the UE, wherein the UE data is collected via the user plane connection, and process the UE data based on policies agreed to for the UE data collection that is configured in the AF entity, wherein a UE internet protocol (IP) address is used for the user plane connection, and wherein the AF profiles comprise at least one event identifier (ID) supported by the AF entity and at least one supported application ID.

19. The AF entity of claim 16, wherein the at least one processor is further configured to:

receive, from the NWDAF entity, the list of the SUPIs.

20. The AF entity of claim 19, wherein the at least one processor is further configured to:

find the SMF entity, from a unified data repository (UDR) entity, based on the list of SUPIs, transmit, to the SMF entity, a third request for a subscription to an event exposure function of the SMF entity, the third request including a target of an event reporting set to a SUPI based on the list of the SUPIs and an internet protocol (IP) address allocation or change, receive, from the SMF entity, a UE IP address corresponding to the SUPI, and map the UE IP address to the SUPI.

* * * * *